United States Patent
Kung

(10) Patent No.: US 12,361,138 B1
(45) Date of Patent: Jul. 15, 2025

(54) IDENTIFYING SOFTWARE PRODUCTS THAT ARE INSTALLED ON A COMPUTER

(71) Applicant: Trend Micro Incorporated, Tokyo (JP)

(72) Inventor: ChiChang Kung, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 267 days.

(21) Appl. No.: 18/310,807

(22) Filed: May 2, 2023

(51) Int. Cl.
*G06F 21/00* (2013.01)
*G06F 21/57* (2013.01)
*G06N 20/00* (2019.01)

(52) U.S. Cl.
CPC ........... *G06F 21/577* (2013.01); *G06N 20/00* (2019.01); *G06F 2221/033* (2013.01)

(58) Field of Classification Search
None
See application file for complete search history.

(56) References Cited

U.S. PATENT DOCUMENTS

| | | | |
|---|---|---|---|
| 2021/0273969 A1* | 9/2021 | Shakarian | G06F 40/20 |
| 2023/0075290 A1* | 3/2023 | Wåreus | G06F 21/577 |
| 2023/0076127 A1* | 3/2023 | Yu | G06F 40/295 |
| 2023/0205891 A1* | 6/2023 | Yellapragada | H04L 63/1433 726/25 |
| 2023/0412634 A1* | 12/2023 | Engelberg | G06N 5/04 |
| 2023/0412635 A1* | 12/2023 | Binyamini | G06N 5/022 |
| 2024/0297883 A1* | 9/2024 | Boyer | H04L 63/1433 |

FOREIGN PATENT DOCUMENTS

KR 20200056627 A * 5/2020 ............ G06F 21/57

OTHER PUBLICATIONS

Sawant, Devesh, Manjesh K. Hanawal, and Atul Kabra. "Improving Discovery of Known Software Vulnerability For Enhanced Cybersecurity." arXiv preprint arXiv:2412.16607 (2024). (Year: 2024).*
Anwar, Afsah, et al. "Cleaning the NVD: Comprehensive quality assessment, improvements, and analyses." IEEE Transactions on Dependable and Secure Computing 19.6 (2021): 4255-4269. (Year: 2021).*
Xu, Charlie et al. "Applying Ensembling Methods to BERT to Boost Model Performance." (2019). (Year: 2019).*

(Continued)

*Primary Examiner* — Jeffery L Williams
(74) *Attorney, Agent, or Firm* — Beyer Law Group LLP

(57) ABSTRACT

Software products that are installed on a computer are identified from application names of application programs on the computer. The application names are pre-filtered to discard those that do not meet initial product filtering criteria that were used to collect sample data from which training datasets for training encoder-only transformer models were selected. Application names that meet initial product filtering criteria are classified using the encoder-only transformer models. Application names that have been classified by the encoder-only transformer models as those of supported products are post-filtered to discard those that do not meet the initial product filtering criteria of corresponding supported products. Application names that have not been discarded by the post-filtering are deemed to be those of software products installed on the computer.

15 Claims, 6 Drawing Sheets

(56) References Cited

OTHER PUBLICATIONS

Albers Uzila, "Beautifully Illustrated: NLP Models from RNN to Transformer", https://towardsdatascience.com/beautifully-illustrated-npl-models-from-rnn-to-transformer-80d69faf2109, Oct. 11, 2022, downloaded Apr. 3, 2023.

Devlin et al., "BERT: Pre-training of Deep Bidirectional Transformers for Language Understanding", https://aclanthology.org/N19-1423.pdf, May 24, 2019, downloaded Mar. 23, 2023.

"Fine-Tune a Pretrained Model", https://buggingface.co/docs/transformers/training, downloaded Apr. 3, 2023.

Samarth Agrawal, "How to Split Data into Three Sets (Train, Validation, and Test) and Why?", https://towardsdatascience.com/how-to-split-data-into-three-sets-train-validation-and-test-and-why-e50d22d3e54c, May 17, 2021, downloaded Apr. 3, 2023.

"Named Entity Recognition (NER)", https://paperswithcode.com/task/named-entity-recognition-ner#:~:text=Named, downloaded Apr. 3, 2023.

Jeevan Chavan, "NLP: Tokenization, Stemming, Lemmatization, Bag of Words, TF-IDF, POS", https://medium.com/@jeevanchavan143/nlp-tokenization-stemming-lemmatization-bag-of-words-tf-idf-pos-7650f83c60be#:~:text=Stemming, May 8, 2020, downloaded Apr. 5, 2023.

"Official Common Platform Enumeration (CPE) Dictionary", https://nvd.nist.gov/products/cpe#:~:text=CPE, downloaded Apr. 3, 2023.

Liu et al., "RoBERTa: A Robustly Optimized BERT Pretraining Approach", https://arxiv.org/pdf/1907.11692.pdf, Jul. 26, 2019, downloaded Mar. 23, 2023.

Amir Jafari, "Comparison Study Between Token Classification and Sequence Classification In Text Classification", https://arxiv.org/pdf/2211.13899.pdf, Nov. 25, 2022, downloaded Apr. 3, 2023.

Pragati Baheti, "Train Test Validation Split: How To & Best Practices [2023]", https://www.v7labs.com/blog/train-validation-test-set#:~:text=In, Mar. 2, 2023, downloaded Apr. 3, 2023.

"Transformer (Machine Learning Model)", https://en.wikipedia.org/wiki/Transformer, Jul. 10, 2023, downloaded Apr. 5, 2023.

Enes Zvornicanin, "What Are Embedding Layers in Neural Networks", https://www.baeldung.com/cs/neural-nets-embedding-layers, Feb. 2, 2023 downloaded Apr. 4, 2023.

"Word Embedding", https://en.wikipedia.org/wiki/Word_embedding, Jul. 11, 2023, downloaded Apr. 3, 2023.

* cited by examiner

IDENTIFYING SOFTWARE PRODUCTS THAT ARE INSTALLED ON A COMPUTER

TECHNICAL FIELD

The present disclosure is generally directed to computer systems.

BACKGROUND

Software products are available from various publishers, such as the Microsoft Corporation, Adobe Inc., etc. Identifying the software products that are installed on a computer has many usages including for cybersecurity. For example, vulnerability assessment, attack surface discovery, and device role discovery for a computer may require knowledge of what software products are installed on the computer.

A software product may have one or more application programs, with an application program having a corresponding application name. On the Linux® operating system, a package name of an application program can serve as a unique identifier, and can thus be used to distinguish software products.

In contrast, application names on the Microsoft Windows® operating system are mainly for display purposes and can have many forms. For example, there are several thousand application names that include "Firefox" on the Microsoft Windows® operating system, including "Firefox Developer Edition (x64 cs)", "Mozilla Firefox (x64 en-US)", "Mozilla Firefox (x64 ja)", "Mozilla Firefox (x64 zh-TW)", and "Mozilla Firefox 31.8.0 ESR (x86 es-ES)."

A software publisher may also offer different products that have similar application names. For example, although "Adobe Acrobat 2020 Pro", "Adobe Acrobat 2017 Standard", "Adobe Acrobat DC", "Adobe DC Pro", and "Acrobat DC Standard" look similar, they are application names of two different products. More particularly, "Adobe Acrobat 2020 Pro" and "Adobe Acrobat 2017 Standard" are application names of the Adobe Acrobat® product; whereas "Adobe Acrobat DC", "Adobe DC Pro", and "Acrobat DC Standard" are application names of the Adobe Acrobat DC® product.

Worse, some application names misleadingly appear as that of a software product. For example, "Firefox PKCS11 Loader" is the application name of a loader for the Firefox® web browser but is not the Firefox® web browser. Therefore, the use of a simple keyword check (e.g., contains "Firefox") to identify installed software products will yield many incorrect results including false positives. False positives are especially problematic in the cybersecurity industry.

It is important to identify what software products are installed on a computer, because different software products may have different vulnerabilities, etc. However, the multitude of application name variations on the Microsoft Windows® operating system and similar operating systems makes identifying installed software products very difficult for cybersecurity or other purposes.

BRIEF SUMMARY

In one embodiment, software products that are installed on a computer are identified from application names of application programs on the computer. The application names are pre-filtered to discard those that do not meet initial product filtering criteria that were used to collect sample data from which training datasets for training encoder-only transformer models were selected. Application names that meet the initial product filtering criteria are classified using the encoder-only transformer models. Application names that have been classified by the encoder-only transformer models as those of supported products are post-filtered to discard those that do not meet corresponding initial product filtering criteria. Application names that have not been discarded by the post-filtering may be deemed to be those of software products installed on the computer.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
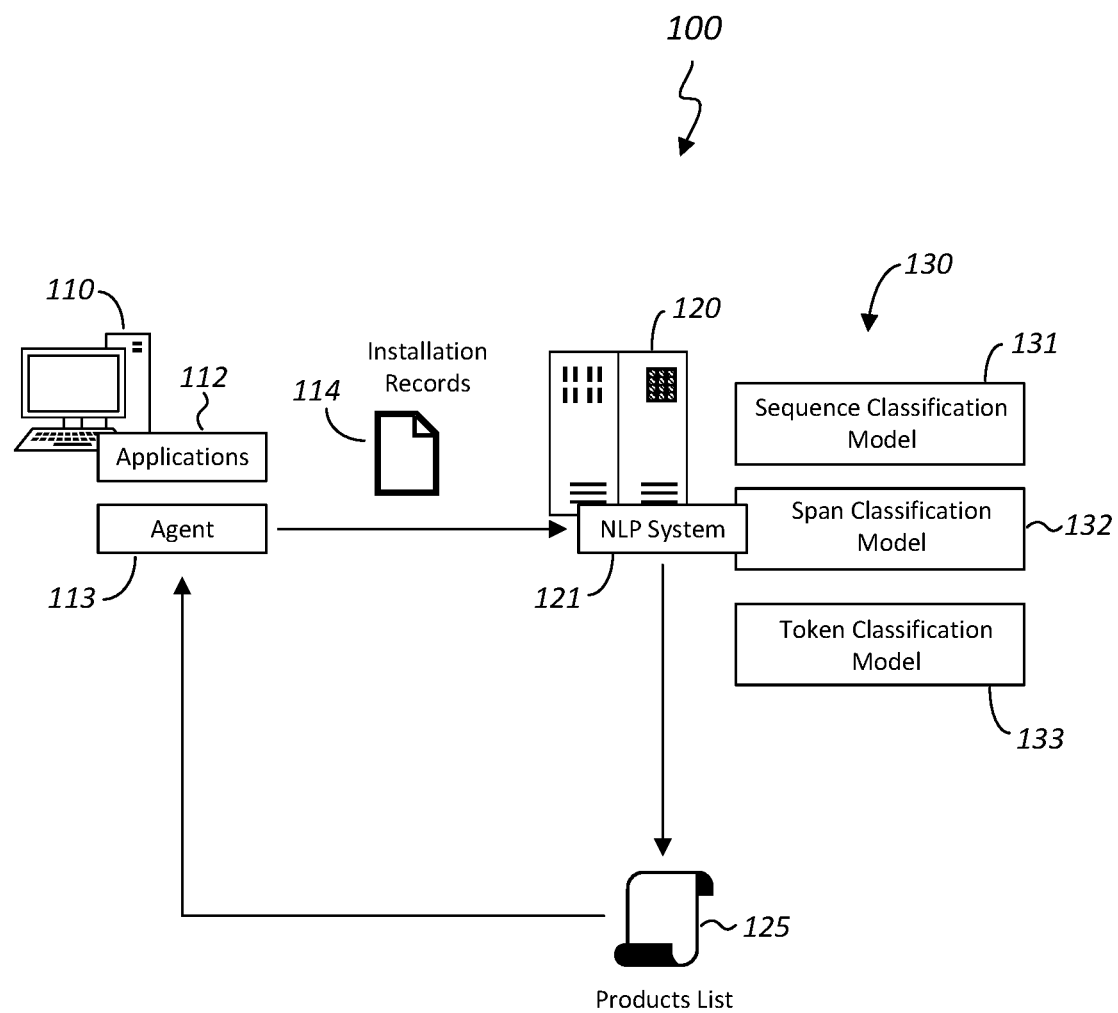
FIG. 1 is a block diagram of a system for identifying software products that are installed on a computer in accordance with an embodiment of the present invention.

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are explained in the context of the Microsoft Windows® operating system as an example. It is to be noted, however, that embodiments of the present invention are equally applicable to other operating systems where an application name of an application program does not uniquely identify a corresponding software product. There are several possible approaches to identifying installed software products on these types of operating systems.

Common Platform Enumeration (CPE), which is managed by the National Institute of Standards and Technology, is a structured naming scheme for information technology systems, software, and packages. For a published vulnerability in the National Vulnerability Database, a CPE name may be used to identify the corresponding vulnerable software product. Unfortunately, installation records of the Microsoft Windows® operating system generally do not include CPE names.

Publisher unique identifiers are available for some software products. For example, software products of the Microsoft Corporation (e.g. Microsoft Office® products) generally have corresponding registry keys that can be used for precise identification, e.g. a Microsoft Office® 2013 product versus a Microsoft Office® 2016 product. However, this is not generally the case with software products on the Microsoft Windows® operating system.

A software product may be uniquely identified by calculating the hash of its executable file, referred to herein as "executable hash." This approach requires an agent on a computer to perform a large number of hash calculations that are computationally expensive given the large number of executable files on a computer. Another drawback is that a backend system that works in conjunction with the agent will have to maintain a large mapping database.

An application name may be hashed using a locality sensitive hash (LSH). With LSH, two similar application names will have two different hashes that are close to each other in the numerical space. A clustering algorithm may be used to cluster similar hashes. A drawback to the LSH approach is that a clustering algorithm is generally not very precise (e.g. less than 70-80% accurate).

Identification rules, such as those using regular expressions, may be manually created to identify software products from application names. A drawback to this approach is that the identification rules will not be able to identify newly-released software products. Therefore, the identification rules need to be continuously updated to keep up with new releases.

Referring now to FIG. 1, there is shown a block diagram of a system 100 for identifying software products that are installed on a computer in accordance with an embodiment of the present invention. In one embodiment, the system 100 includes a computer 110 and a backend system 120. The computer 110 and the backend system 120 may communicate over a computer network, which in this example includes the public Internet. Only one computer 110 is shown for clarity of illustration. In practice, the backend system 120 may identify software products that are installed on a plurality of computers.

A computer 110 may be a desktop, laptop, workstation, or other computing device that runs the Microsoft Windows® operating system. The computer 110 has a plurality of application programs 112 installed thereon. The installation records 114 comprise installation records of the application programs 112. The installation records 114 may indicate an application name, publisher, and product version (e.g., version number) of the installed application programs 112. Information in the installation records 114 may be obtained from the operating system, which is the Microsoft Windows® operating system in this example.

An agent 113 comprises program code that is configured to gather the installation records 114 in the computer 110, and transmit the installation records 114 to the backend system 120 over the Internet. The agent 113 may be a dedicated agent for a natural language processing (NLP) system 121 or part of cybersecurity software of the computer 110. The agent 113 may provide the installation records 114 to the backend system 120, and receive from the backend system 120 an installed products list 125 that lists software products installed on the computer 110.

The agent 113 may use information from the installed products list 125 to perform a cybersecurity procedure. For example, the agent 113 may use information from the installed products list 125 to identify an installed software product that has a vulnerability, and request a patch from the publisher of the software product. As can be appreciated, information included in the installed products list 125 may also be used for other cybersecurity-related purposes, including identifying the role of the computer 110 (e.g., determining that the computer 110 works as a database server), identifying software products that need to be configured a certain way to prevent cyberattacks (e.g., Internet-facing software), etc.

It is to be noted that information regarding software products installed on the computer 110 may be utilized for cybersecurity purposes by systems other than the computer 110. For example, the backend system 120 may calculate a risk score for the computer 110 or user of the computer 110 based on presence of particular software products on the computer 110. Such risk scores may be sent by the backend system 120 to the user by email, text, etc. without having to go through the agent 113. Information regarding installed software products on a computer may also be used for other purposes without detracting from the merits of the present invention.

The backend system 120 may comprise one or more server computers or a cloud computing platform, such as the Amazon Web Services (AWS®) platform. The backend system 120 hosts the NLP system 121, which comprises instructions that are stored in a memory of the backend system 120 that when executed by at least one processor of the backend system 120 cause the backend system 120 to perform natural language processing to identify installed software products as described herein. In one embodiment, the NLP system 121 includes an ensemble model 130, which comprises a sequence classification model 131, a span classification model 132, and a token classification model 133. The ensemble model 130 is trained to identify software products from a listing of application names, such as those in the installation records 114.

In the example of FIG. 1, application names indicated in the installation records 114 are classified by the ensemble model 130 to identify software products that are installed on the computer 110. The ensemble model 130 comprises encoder-only transformer models that, as taught in the present disclosure, allow for identification of application names of software products with excellent accuracy. The software products identified to be installed on the computer are indicated in the installed products list 125, which may be transmitted from the backend system 120 to the computer 110.

In the field of computer science, a transformer is a machine learning model that is commonly used in natural language processing. A transformer may have an encoder, decoder, or both. Briefly, an encoder transforms text into multi-dimensional numerical vectors, whereas a decoder transforms numerical vectors into text. A decoder-only model or an encoder-decoder model can be used to generate text. In contrast, an encoder-only model cannot be used to generate text. However, current academic research considers an encoder-only model to be a better choice for certain natural language processing tasks, such as text classification and token classification. Examples of encoder-only transformer models include BERT ("Bidirectional Encoder Representations from Transformers"), ROBERTa ("A Robustly Optimized BERT Pretraining Approach"), and DistilBERT ("A distilled version of BERT"). In one embodiment, each of the sequence classification model 131, span classification model 132, and token classification model 133 comprises a fine-tuned RoBeRTa or DistilBERT model.

Figure 2:
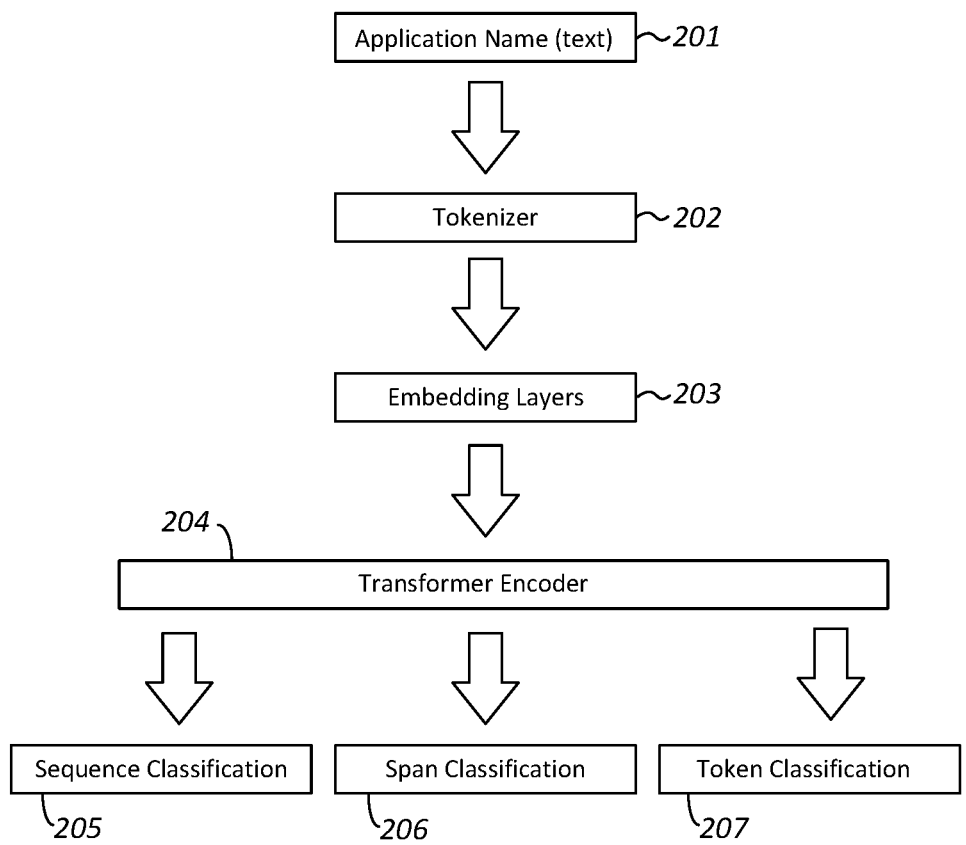
FIG. 2 is an architectural diagram of an encoder-only ensemble model in accordance with an embodiment of the present invention.

FIG. 2 is an architectural diagram of an encoder-only ensemble model in accordance with an embodiment of the present invention. In the example of FIG. 2, an application name (FIG. 2, 201) is the input to be classified by sequence classification (FIG. 2, 205), span classification (FIG. 2, 206), and token classification (FIG. 2, 207). The output of each classification, also referred to as inference result or answer, indicates whether the input application name is that of a supported product. A supported product is a software product that the encoder-only transformer models have been trained to identify.

In the example of FIG. 2, the input text to the ensemble model is an application name (FIG. 2, 201) of an application program installed on a computer. The application name, which is represented as a string, is transformed by a tokenizer (FIG. 2, 202) into a sequence of numbers referred to as "tokens," with each token representing a continuous string of one or more characters of the application name. In addition to numerical transformation, the tokenizer may also perform stemming, lowercasing, punctuation removal, and/or other pre-processing steps on the application name.

Embedding layers (FIG. 2, 203) may include a word embedding layer, a segment embedding layer, and a position embedding layer. The word embedding layer transforms a sequence of tokens into a high-dimensional embedding vector. Because the embedding vectors are learned during training, the embedding vectors carry certain structural and semantic properties. The segment embedding layer indicates the sentence that a token belongs to, whereas the position embedding layer indicates the relative position of a token within the sentence. An application name (which corresponds to a sentence) and a segment of the application name may each be transformed by the embedding layers into a single embedding vector.

An embedding vector from the embedding layers 203 is input to a transformer encoder 204. The transformer encoder 204 comprises a stack of encoder layers, with each encoder layer comprising a self-attention sublayer and a feed-forward sublayer. The contributions of all other tokens to a particular token are learned during training and are stored in the self-attention sublayer. The output of the self-attention sublayer is a set of context vectors, which are fed to an associated feed-forward sublayer. The feed-forward sublayer, which is a fully connected neural network, transforms the context vectors and the input text by learning the weights of different context vectors. The output of the transformer encoder 204 is fed into multiple downstream natural language processing tasks, which in one embodiment are sequence classification (FIG. 2, 205), span classification (FIG. 2, 206), and token classification (FIG. 2, 207).

Generally, a pre-trained model has been trained using a relatively large training dataset to perform a task that is similar or related to a downstream task. In embodiments of the invention, the pre-trained model has been trained for natural language processing tasks. Examples of such pre-trained models include the BERT, ROBERTa, and DistilBERT models. A pre-trained model may be fine-tuned to perform a particular a natural language processing task. Fine-tuning entails training the pre-trained model for the objective of the downstream task using a relatively small training dataset, compared to that used to pre-train the model. A pre-trained BERT, ROBERTa, DistilBERT, or other transformer model may be fine-tuned to perform sequence, span, or text classification as described herein.

Creation of training datasets for fine-tuning a pre-trained model is later described beginning with FIG. 3.

Continuing the example of FIG. 2, the sequence classification task classifies the input application name into one of a fixed number of categories. In one embodiment, the categories are software products supported by the NLP system and shadow products. A shadow product is related to a supported product, but the shadow product is not a supported product. That is, presence of an application name of a shadow product on the computer does not indicate installation of a supported product on the computer. More particularly, an application name of a shadow product will meet the initial product filtering criteria of a corresponding supported product, but is still not regarded as the supported product during the labeling process for training.

As a particular example, "Spelling Dictionaries Support For Adobe Acrobat Reader DC" is of a shadow product because it is related to but is not of the supported Adobe Acrobat® DC product. In that example, given "Adobe Acrobat Reader DC" as input, the sequence classification task may answer "acrobat_dc", indicating that the Adobe Acrobat® DC product is installed on the computer. On the other hand, given "Spelling Dictionaries Support For Adobe Acrobat Reader DC" as input, the sequence classification task may answer "acrobat_dc_shadow", with "shadow" indicating that the application name is that of a shadow product and not of a supported product. In general, it is difficult for a machine learning based natural language model to classify a text correctly if the text contains the key words in the right sequence (as seen in the training dataset), but at the same time contains words that indicates otherwise like in the preceding example. Shadow Product categories advantageously address such difficulties.

The span classification task classifies an application name to a substring that is within the application name. That is, given an application name as context, the span classification task answers the question of "what is the name of the software product?", with the name of the software product being a substring of the application name. As a particular example, given "Firefox 91.7.0" as input application name, the span classification task classifies the application name as "Firefox", which is a supported product in this example, indicating that the Firefox® product is installed on the computer. On the other hand, given "Firefox Configuration" as the input application name, the span classification task classifies the application name as "Configuration", which is not a supported product in this example. That is, the application name classified as "Configuration" does not indicate installation of a supported product on the computer. The expected answer of the span classification task for each of the supported products may be stored in a mapping table, which can be consulted during inference to determine if an answer indicates a supported product.

An expected answer from the span classification task for an application name of a supported product may be mapped to a corresponding product identifier (ID) of the supported product (e.g., "acrobat_dc"). Any answer from the span classification task that cannot be mapped to a supported product is deemed to indicate a shadow product. As an example, an answer containing strings, such as "Configuration" or "Spelling Dictionary", that cannot be mapped to a supported product is deemed to indicate a shadow product. That is, for shadow products, the span classification task is mainly concerned with identifying a shadow product as not a supported product. Traditional machine learning performance metrics can thus be relaxed when it comes to span classification and shadow products.

A limitation of span classification is that the answer has to be exactly one substring of the application name, which is not feasible in some cases. For example, given "Mozilla Firefox 31.8.0 ESR (x86 es-ES)", the desired answer is "Firefox ESR", which is not feasible with span classification. However, since sequence classification and token classification can recognize the application name correctly, the ensemble model can still indicate the correct supported product.

The token classification task classifies each token of an input application name to one of a fixed number of categories. In one embodiment, the token classification task classifies a token as either "product", "shadow", or "other". A "product token" indicates that the token is of a supported product; a "shadow token" indicates that the token is of a shadow product; and the "other token" indicates that the token is neither a product token nor a shadow token. For a given application name, tokens that are classified as product tokens and shadow tokens may be converted to lower case and concatenated, with a space character in between tokens, into a string. The application name may be deemed to be that of a supported product if the concatenated string maps to a product ID of the supported product.

Figure 3:
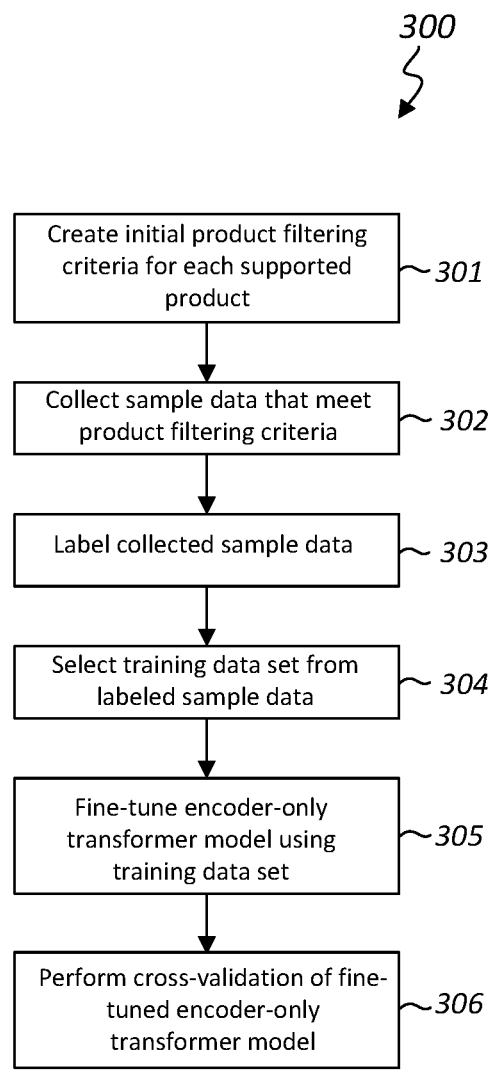
FIG. 3 is a flow diagram of a method of fine-tuning encoder-only transformer models to identify software products that are installed on a computer in accordance with an embodiment of the present invention.

FIG. 3 is a flow diagram of a method 300 of fine-tuning encoder-only transformer models to identify software products that are installed on a computer in accordance with an embodiment of the present invention. In the method 300, the fine-tuned encoder-only transformer models identify installed software products based at least on application names of application programs on the computer.

Example supported products may be the Adobe Acrobat®, Adobe Acrobat DC®, Adobe Acrobat Reader®, and Adobe Acrobat Reader DC® products, which are different product offerings by Adobe Inc. The example supported products, which is limited to four for clarity of illustration, will be used to illustrate subsequent steps of the method 300.

In step 301, an initial product filtering criteria is created for each supported product. This results in the NLP system having a set of initial product filtering criteria, with each supported product having its own initial product filtering criteria. In one embodiment, an initial product filtering criteria indicate existence and non-existence of certain keywords in an application name and publisher name of a supported product, with the supported product meeting (i.e., satisfying) only its assigned initial product filtering criteria, and does not meet the initial product filtering criteria assigned to other supported products. The initial product filtering criteria may include a publisher name to distinguish supported products from different publishers. For supported products from the same publisher, the initial product filtering criteria are selected such that the application names are distinguishable.

Table 1 shows example initial product filtering criteria assigned to example supported products. The examples are provided for illustration purposes only and do not necessarily apply to actual computing environments.

TABLE 1

| Supported Product | Initial Product Filtering Criteria |
| --- | --- |
| Adobe Acrobat | Publisher name contains "Adobe"; and application name contains "Acrobat"; and application name does not contain "Reader"; and application name does not contain "DC". |

TABLE 1-continued

| Supported Product | Initial Product Filtering Criteria |
| --- | --- |
| Adobe Acrobat DC | Publisher name contains "Adobe"; and application name contains "Acrobat"; and application name does not contain "Reader"; and application name contains "DC" |
| Adobe Acrobat Reader | Publisher name contains "Adobe"; and application name contains "Acrobat"; and application name contains "Reader"; and application name does not contain "DC" |
| Adobe Acrobat Reader DC | Publisher name contains "Adobe"; and application name contains "Acrobat"; and application "Reader"; and application name contains "DC" |

It is to be noted that the set of initial product filtering criteria is mutually exclusive in that a particular supported product will only meet its assigned initial product filtering criteria; the particular supported product will not meet initial product filtering criteria assigned to other supported products. For example, the Adobe Acrobat® product will only meet its assigned initial product filtering criteria, and not the initial product filtering criteria of the Adobe Acrobat DC®, Adobe Acrobat Reader®, or Adobe Acrobat Reader DC® product. As another example, the Adobe Acrobat DC® product will only meet its assigned initial product filtering criteria, and not the initial product filtering criteria of the Adobe Acrobat®, Adobe Acrobat Reader®, or Adobe Acrobat Reader DC® product.

It is to be further noted that unlike an application name of a supported product, it is possible for an application name of a shadow product to meet the initial product filtering criteria of one or more supported products. This is the nature of a shadow product, as by definition its application name is similar to that of a supported product. However, an application name of a shadow product contains other words that the classification models are trained to identify. Therefore, even if an application name of a shadow product meets the initial product filtering criteria of one or more supported products, the classification models are still able to identify the application name as that of a shadow product.

In step 302, sample data that meet the initial product filtering criteria of the supported products are collected. In one embodiment, installation records of a plurality of computers are collected. Application names of application programs that meet any of the set of initial product filtering criteria are identified from the installation records, and collected as sample data. Application names of application programs that do not meet at least one of the set of initial product filtering criteria are not collected, i.e., not included in the collected sample data.

The initial product filtering criteria allow for removal from consideration application names of application programs that have nothing to do with the supported products. The resulting collected sample data are application names of supported products and shadow products. For example, the following application names of shadow products will meet the initial product filtering criteria of the Adobe Acrobat Reader® product and will thus be included in the collected sample data: "Microsoft Azure Information Protection Plugin For Adobe Acrobat Reader"; "Asian Language And Spelling Dictionaries Support For Adobe Acrobat Reader"; and "Adobe Acrobat 7.0.1 and Reader 7.0.1 Update".

In step 303, the collected sample data are labeled. The labeling of the collected sample data depends on the classification task of the model. In one embodiment, where the ensemble model comprises a sequence classification model, a span classification model, and a token classification model, three separate labeled sample data are created, one for each classification model. That is, the collected sample data are labeled from which a first dataset for training the sequence classification model is selected; the collected sample data are separately labeled from which a second dataset for training the span classification model is selected; and the collected sample data is separately labeled from which a third dataset for training the token classification model is selected.

For sequence classification, an application name of a supported product is labeled to identify it as that of the supported product, and an application name of a shadow product is labeled to identify it as that of the shadow product. A label may be used as a product ID. Labels may be mapped to corresponding product IDs to identify corresponding supported and shadow products during inference.

For example, the supported Adobe Acrobat® product has several application names including "Adobe Acrobat 2020 Professional" and "Adobe Acrobat 2020 Standard", which may be labeled as "acrobat". In that example, "acrobat" may be used as the product ID for the Adobe Acrobat® product. In contrast, the application name "App-V Deployment Kit For Adobe Acrobat" of a shadow product related to the Adobe Acrobat® product may be labeled as "acrobat_shadow," which may be used as the product ID of the shadow product. During inference, the sequence classification model will classify "Adobe Acrobat 2020 Professional" as "acrobat", which is mapped to the supported Adobe Acrobat® product. On the other hand, during inference, the sequence classification model will classify "App-V Deployment Kit For Adobe Acrobat" as "acrobat_shadow", which is mapped to the corresponding shadow product. Table 2 shows example labeling of collected sample application names for sequence classification.

TABLE 2

| Supported product | Application Name | Label |
|---|---|---|
| Adobe Acrobat | Adobe Acrobat 2020 Professional | "acrobat" |
| | Adobe Acrobat 2020 Standard | "acrobat" |
| | App-V Deployment Kit For Adobe Acrobat | "acrobat shadow" |
| Adobe Acrobat DC | Adobe Acrobat Pro DC | "acrobat_dc" |
| | Adobe Acrobat DC 2020 | "acrobat_dc" |
| | Acrobat DC License Replacement | "acrobat_dc_shadow" |
| Adobe Acrobat Reader | Adobe Acrobat Reader MUI | "acrobat_reader" |
| | Adobe Acrobat Reader - Italiano | "acrobat_reader" |
| | Asian Language Support for Adobe Acrobat Reader | "acrobat_reader shadow" |
| Adobe Acrobat Reader DC | Adobe Acrobat Reader DC (22.003.20258) | "acrobat_reader_dc" |
| | Adobe Acrobat Reader DC MUI | "acrobat_reader_dc" |
| | Extended Asian Language font pack for Adobe Acrobat Reade rDC | "acrobat_reader_dc shadow" |

For span classification, an application name of a supported product is labeled with a substring that identifies the supported product and a starting character position of the substring in the application name. Similarly, an application name of a shadow product is labeled with a substring that identifies the application name as that of a shadow product and the position of the substring in the application name.

A mapping of the labels to corresponding supported products and shadow products may be created to facilitate lookup during inference. During inference, an answer from the span classification model may have to be converted to the format of the product IDs. For example, the answer may be converted to lower case and then mapped to product IDs using a mapping table. The mapping table gets around situations where the answer does represent the supported product but is not identical to the product ID, such as an answer of "acrobat dc" mapped to the product ID "acrobat dc". Table 3 shows example labeling of collected sample application names for span classification.

TABLE 3

| Supported product | Application Name | Label | Start Char Position |
|---|---|---|---|
| Adobe Acrobat | Adobe Acrobat 2020 Professional | "acrobat" | 6 |
| | Adobe Acrobat 2020 Standard | "acrobat" | 6 |
| | App-V Deployment Kit For Adobe Acrobat | "deployment" | 6 |
| Adobe Acrobat DC | Adobe Acrobat DC Pro | "acrobat dc" | 6 |
| | Adobe Acrobat DC 2020 | "acrobat dc" | 6 |
| | Acrobat DC License Replacement | "license" | 11 |
| Adobe Acrobat Reader | Adobe Acrobat Reader MUI | "acrobat reader" | 6 |
| | Adobe Acrobat Reader - Italiano | "acrobat reader" | 6 |
| | Asian Language Support for Adobe Acrobat Reader | "support" | 15 |
| Adobe Acrobat Reader DC | Adobe Acrobat Reader DC (22.003.20258) | "acrobat reader dc" | 6 |
| | Adobe Acrobat Reader DC MUI | "acrobat reader dc" | 6 |
| | Extended Asian Language font pack for Adobe Acrobat Reader DC | "font pack" | 23 |

In the example of Table 3, "Adobe Acrobat 2020 Professional" is labeled as "acrobat" (which indicates a supported product in this example), and the substring "acrobat" may be found at starting character position "6" (with the first character of the application name being at zero). It is to be noted that for span classification, a label for an application name of a shadow product is readily distinguishable from that of a supported product. More particularly, any label that does not indicate a supported product may be presumed to indicate a shadow product.

For token classification, each token of an application name is labeled to indicate whether the token is a product token that represents a supported product, a shadow token that represents a shadow product, or other (i.e., neither a product token nor a shadow token). This allows the token classification model to be trained to identify tokens indicative of a supported product, shadow product, or other. During inference, all tokens classified as being a product token or a shadow token are converted to lower case and concatenated, with a space character in between tokens, for mapping using a mapping table. The application name is regarded as a supported product if the concatenated string maps to a product ID of a supported product. Table 4 shows example labeling of collected sample application names for token classification. In table 4, "P" stands for a product token, "S" stands for a shadow token, and "O" stands for an other token. The labels are for each token, starting from the beginning of the application name.

TABLE 4

| Supported product | Application Name | Label |
|---|---|---|
| Adobe Acrobat | Adobe Acrobat 2020 Professional | "O", "P", "O", "O" |
| | Adobe Acrobat 2020 Standard | "O", "P", "O", "O" |
| | App-V Deployment Kit For Adobe Acrobat | "O", "S", "S", "O", "O", "P" |
| Adobe Acrobat DC | Adobe Acrobat DC Pro | "O", "P", "P", "O" |
| | Adobe Acrobat DC 2020 | "O", "P", "P", "O" |
| | Acrobat DC License Replacement | "P", "P", "S", "O" |
| Adobe Acrobat Reader | Adobe Acrobat Reader MUI | "O", "P", "P", "O" |
| | Adobe Acrobat Reader - Italiano | "O", "P", "P", "O", "O" |
| | Asian Language Support for Adobe Acrobat Reader | "S", "S", "S", "O", "P", "P", |
| Adobe Acrobat Reader DC | Adobe Acrobat Reader DC (22.003.20258) | "O", "P", "P", "P", "O" |
| | Adobe Acrobat Reader DC MUI | "O", "P", "P", "P", "O" |
| | Extended Asian Language font pack for Adobe Acrobat Reader DC | "O", "S", "S", "S", "S", "O", "O", "P", "P", "P" |

For example, in table 4, the application name "Adobe Acrobat Reader DC MUI" is labeled to indicate that "Adobe" is an other token, "Acrobat" is a product token, "Reader" is a product token, "DC" is a product token, and "MUI" is an other token. During inference, given "Adobe Acrobat Reader DC MUI", the token classification model will answer "Acrobat Reader DC", which will be mapped to "acrobat_reader_dc" indicating that it is that of a supported product.

As another example, the application name "App-V Deployment Kit For Adobe Acrobat" is labeled to indicate that "App-V" is an other token, "Deployment" is a shadow token, "Kit" is a shadow token, "For" is an other token, "Adobe" is an other token, and "Acrobat" is a product token. During the inference, given "App-V Deployment Kit For Adobe Acrobat", the token classification model will answer "Deployment Kit", which does not map to any supported product, so it will not be regarded as that of a supported product.

There will be three separate labeled sample data at the end of step 303, one for training each of the sequence classification model, span classification model, and the token classification model. The following steps 304-306 are performed for each of the models.

In step 304, a training dataset is selected from a corresponding labeled sample data. The goal of training dataset selection is to have a similar number of training data for each supported product to avoid imbalance. For example, each supported product may have a predetermined target number of labeled sample data for training. For each supported product, the labeled sample data may be reduced if the number of labeled sample data exceeds the target number, or augmented if the number of labeled training data is below the target number. For example, assuming a target number of 200, 200 application names may be randomly selected from labeled sample data greater than 200 samples. For labeled sample data less than 200 samples, additional application names may be added by creating synthetic names, e.g., "Adobe Acrobat Reader DC 22.006.20123," "Adobe Acrobat Reader DC 22.010.202999", etc. for the application name "Adobe Acrobat Reader DC". That is, instead of repeating exactly the same application name, using a version number that is consistent with, but different from existing versions, will help reduce the risk of overfitting.

In step 305, the pre-trained model is fine-tuned using the training dataset for the model's task. That is, the pre-trained model is trained using the training dataset for sequence classification to create the sequence classification model, the pre-trained model is trained using the training dataset for span classification to create the span classification model, and the pre-trained model is trained using the training dataset for token classification to create the token classification model.

In step 306, cross-validation is performed on each of the trained models. Validation tests the effectiveness of the model in classifying unseen application names, i.e., application names that are not in the training dataset. In the so-called train-test split validation, a portion of the training dataset is used to train the model, and another portion of the training dataset not used for training is used to validate the model.

In one embodiment, in cross-validation, the training dataset is divided into several sets based on application name pattern. One set is used for validation, and the rest of the sets (not including the validation set) are used for training. The model is trained and validated multiple times, with each of the sets taking turns to be the validation set. Model parameters are tweaked during cross-validation to optimize the model. Table 5 shows example application names being assigned to sets based on application name pattern. In the example of table 5, the name pattern ID is an identifier for a set of application name patterns. In comparison to simple random splitting, cross validation based on name patterns provides a more accurate estimate of the prediction accuracy of a model.

TABLE 5

| Application Name | Name Pattern ID |
|---|---|
| Adobe Acrobat Reader DC | 1 |
| Adobe Acrobat Reader DC MUI | 2 |
| Adobe Acrobat Reader DC - Español | 3 |
| Adobe Acrobat Reader DC - Português | 3 |
| Acrobat Reader DC | 4 |
| Adobe Acrobat Reader DC (2015) MUI | 5 |
| Adobe Acrobat Reader DC (22.003.20258) | 6 |
| Adobe Acrobat Reader DC Pro | 7 |
| Acrobat Reader DC 22.001.20169 | 8 |

In the example of table 5, "Adobe Acrobat Reader DC-Español" and "Adobe Acrobat Reader DC-Português" are grouped together as having the same name pattern, which is assigned a pattern ID of 3. The other application names have different name patterns. In the example of table 5 with eight name patterns, for a four-way validation, the eight name patterns are randomly distributed into four sets, and the model is trained four times. In each training, one set takes turn as the validation set and the other sets as the training set. The average validation loss is calculated after each training to determine the effectives of the model in classifying unseen application names. The model is thereafter deployed to classify application names.

Figure 4:
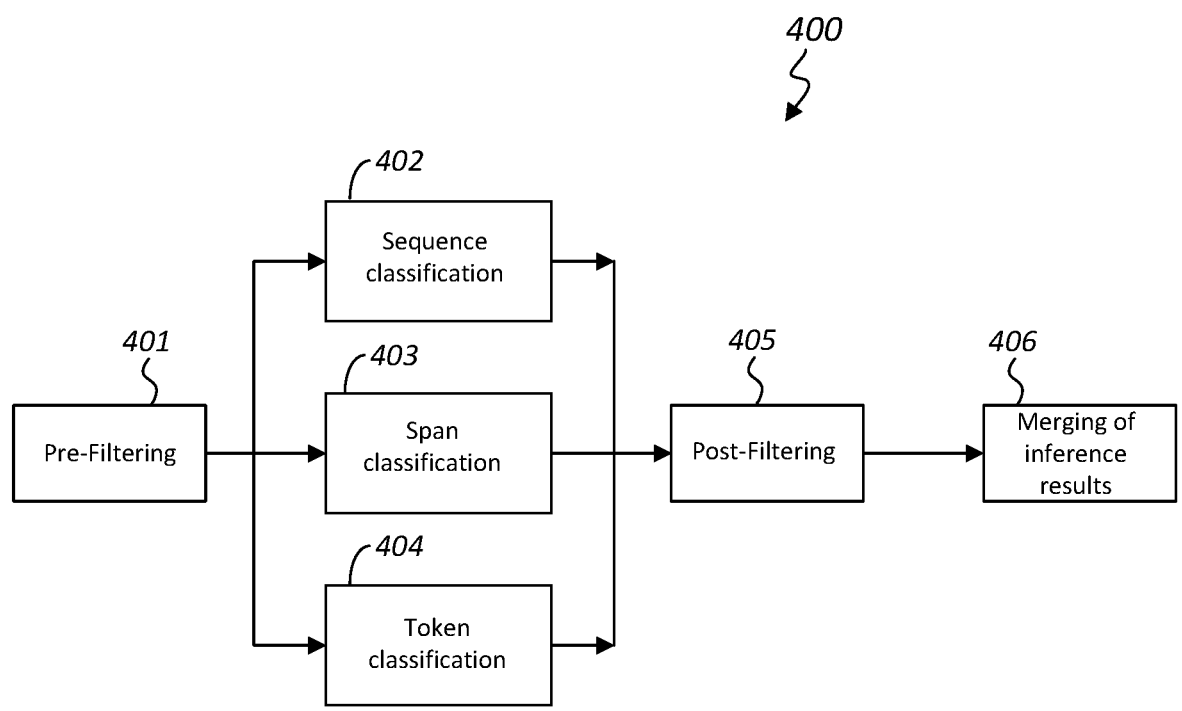
FIG. 4 is a flow diagram of a method of determining whether an application name of an application program is that of a supported product in accordance with an embodiment of the present invention.

FIG. 4 is a flow diagram of a method 400 of determining whether an application name of an application program is that of a supported product in accordance with an embodiment of the present invention. The method 400 receives an application name as input.

In step 401, pre-filtering is performed to determine if an input application name meets any of the set of initial product filtering criteria that were used to collect the sample data for training the ensemble model. An application name that does not meet any of the set of initial product filtering criteria is deemed to be not of a supported product, and is accordingly discarded from classification. An application name that meets at least one of the set of initial product filtering criteria is classified in subsequent steps.

Using table 1 as an example, there are four initial product filtering criteria, one for each of the supported products "Adobe Acrobat," "Adobe Acrobat DC", "Adobe Acrobat Reader", and "Adobe Acrobat Reader DC." Any application name that does not meet any of these initial product filtering criteria in the pre-filtering step are discarded from classification.

It is to be noted that without pre-filtering, an application name that is not of a supported product may still be classified as one of the supported products, because a machine learning model for classification will always predict the input as one of the fixed number of categories. Also, if a special category for unsupported products is made, there will be a data imbalance issue since the unsupported product category will necessarily need much larger amount of training data than other categories, and such imbalance has the risk of skewing the prediction capabilities of the ensemble model. The pre-filtering step advantageously removes from consideration any application name that is not of a supported product or of a shadow product.

In step 402, sequence classification is performed on the input application name using the sequence classification model. The sequence classification model classifies the application name as that of a supported product or of a shadow product. In one embodiment, for a given application name, the sequence classification model provides an answer (e.g., "acrobat", "acrobat shadow") as per the labeling of its training dataset. The answer maps to a supported product or a shadow product.

In step 403, span classification is performed on the input application name using the span classification model. The span classification model classifies the application name to indicate whether the application name is that of a supported product. If the span classification model does not classify the application name as that of a supported product, the application name is deemed to be that of a shadow product. For a given application name, the span classification model provides an answer (e.g., "acrobat", "deployment") that maps to a supported product if the application name is that of the supported product. An answer that does not map to a supported product indicates that the application name is that of a shadow product.

In step 404, token classification is performed on the input application name using the token classification model. The token classification model classifies the application name to determine if the application name is that of a supported product. If the token classification model does not classify the application name as that of a supported product, the application name is deemed to be that of a shadow product. In one embodiment, for a given application name, the token classification model classifies each token of the application name as either a product token, a shadow token, or an other token. All of the product tokens and shadow tokens are converted to lower case and concatenated together, with a space character in between tokens. The application name is deemed to be that of a supported product if the concatenated string maps to the supported product. Otherwise, the application name is deemed to be that of a shadow product.

In step 405, for any of the sequence, span, and token classification steps, post-filtering is performed on any inference result (i.e., answer, classification) that indicates the application name is that of a supported product. In the post-filtering step, the input application name is checked against the initial product filtering criteria of the corresponding, recognized supported product; an application name that does not meet the initial product filtering criteria of its corresponding supported product is discarded. That is, an application name that is classified as that of a supported product but does not meet the initial product filtering criteria of the supported product is discarded. The post-filtering step removes the possibility of an application name that meets the initial product filtering criteria of a first supported product being recognized as that of a second, different supported product. Using table 1 as an example, an application name that has been classified as that of the Adobe Acrobat DC® product must meet the initial product filtering criteria of the Adobe Acrobat DC® product in the post-filtering step.

In step 406, the inference results of the sequence, span, and token classification steps are merged. The merging step deems an input application name to be that of a supported product only if a majority of the ensemble model (i.e., sequence classification model, span classification model, and token classification model) classify the application name as that of the same supported product. That is, an input application name is deemed to be that of a supported product if at least two of the classification models of the ensemble model indicate that the application name is that of the supported product. Otherwise, if only one or none of the classification models of the ensemble model indicates that the application name is that of the same supported product, the merging step deems the application name as not of a supported product.

Figure 5:
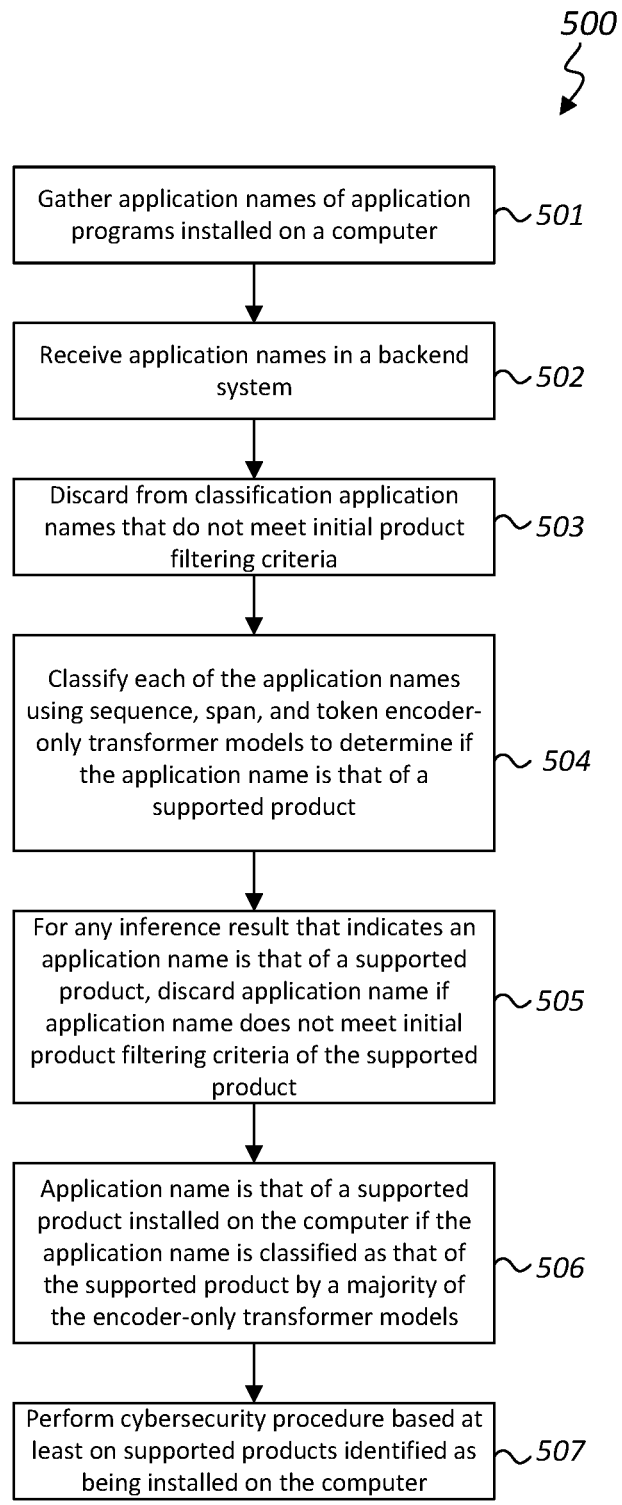
FIG. 5 is a flow diagram of a method of identifying software products that are installed on a computer in accordance with an embodiment of the present invention.

FIG. 5 is a flow diagram of a method 500 of identifying software products that are installed on a computer in accordance with an embodiment of the present invention. The method 500 is explained using the components of the system 100 of FIG. 1 for illustration purposes. As can be appreciated, other components may also be employed without detracting from the merits of the present invention.

In step 501, an agent running on a computer gathers application names of application programs that are installed on the computer. The application names may be from installation records of the operating system of the computer.

In step 502, a backend system receives the application names from the agent over a computer network, such as the public Internet. Steps 503-506 are performed in the backend system.

In step 503, which is a pre-filtering step, application names that do not meet any of the set of initial product filtering criteria are discarded from classification. The set of initial product filtering criteria were used to collect the sample application names from a plurality of application names. Training datasets for training the ensemble model were selected from the collected sample application names.

In step 504, each application name is classified by the ensemble model comprising sequence, span, and token encoder-only transformer models to determine if the application name is that of one of a plurality of supported products, with a supported product being a software product that the sequence, span, and token encoder-only transformer models have been trained, using corresponding training dataset, to identify.

In step 505, which is a post-filtering step, for any inference result of the sequence, span, and token encoder-only transformer models that indicates the application name is that of a supported product, the application name is discarded if the application name does not meet initial product filtering criteria of the supported product. Any discarded application name is not further considered to be of a software product installed on the computer.

In step 506, an application name is deemed to be that of a supported product that is installed on the computer if the application name is classified as that of the supported product by a majority of the sequence, span, and token encoder-only transformer models.

In step 507, a cybersecurity procedure is performed based at least on supported products identified as being installed on the computer. Vulnerability assessment is an example cybersecurity procedure that may be performed based at least on the software products that are installed on the computer. More particularly, vulnerabilities affecting installed software products may be identified and patched using updates from corresponding software publishers. As another example, the identified installed software products may be used to determine the role of the computer, thereby allowing the computer to be protected in accordance with its role. Yet another example, the identified installed software products may be used to discover and protect potential attack surfaces of the computer.

The above embodiments use an ensemble model to classify an application name. In some embodiments where the computing cost of running an ensemble model is too high, a single encoder-only transformer model, such as a token classification model, may be employed to classify the application name.

The computing cost of using one or more encoder-only transformer models may also be reduced by caching. More particularly, the results of classifications may be stored in a cache. If an input application name has a classification in the cache, the classification is simply retrieved from the cache. Otherwise, if the application name does not have a classification in the cache, the application name may be classified using the one or more encoder-only transformer models offline, with the cache being updated with the result of the classification.

Another way of reducing computing cost is to perform batch processing. More particularly, application names to be classified may be assembled as a pool and classified as a batch. Batch processing is especially effective when performed during low-cost hours or on cloud computing infrastructures that charge per runtime.

Figure 6:
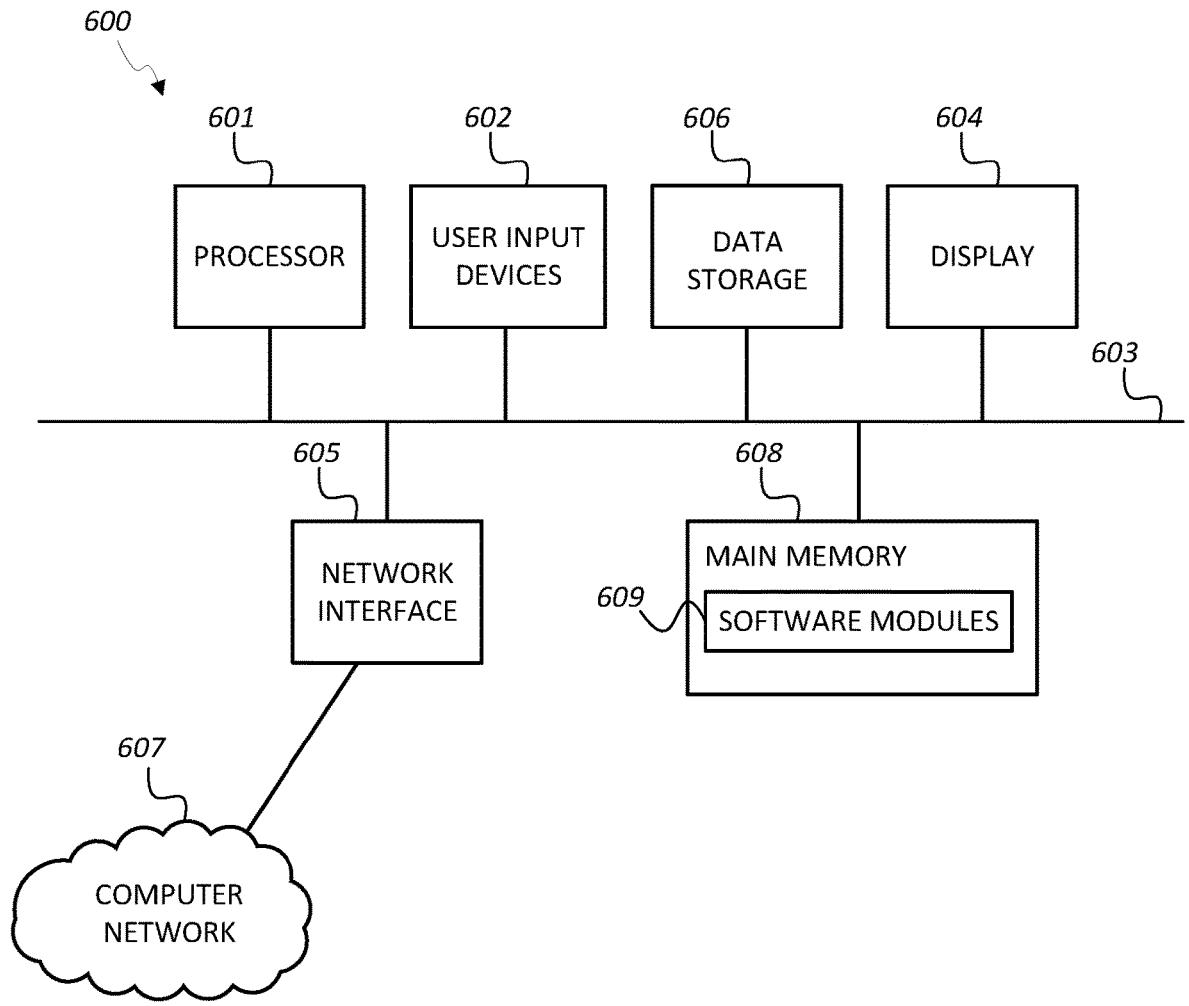
FIG. 6 is a block diagram of a computer system that may be employed with embodiments of the present invention.

Referring now to FIG. 6, there is shown a block diagram of a computer system 600 that may be employed with embodiments of the present invention. The computer system 600 may be employed as any of computers described herein. The computer system 600 may have fewer or more components to meet the needs of a particular cybersecurity application. The computer system 600 may include one or more processors 601. The computer system 600 may have one or more buses 603 coupling its various components. The computer system 600 may include one or more user input devices 602 (e.g., keyboard, mouse), one or more data storage devices 606 (e.g., hard drive, optical disk, solid state drive), a display screen 604 (e.g., liquid crystal display, flat panel monitor), a computer network interface 605 (e.g., network adapter, modem), and a main memory 608 (e.g., random access memory). The computer network interface 605 may be coupled to a computer network 607, which in this example includes the public Internet.

The computer system 600 is a particular machine as programmed with one or more software modules 609, comprising instructions stored non-transitory in the main memory 608 for execution by the processor 601 to cause the computer system 600 to perform corresponding programmed steps. An article of manufacture may be embodied as computer-readable storage medium including instructions that when executed by the processor 601 cause the computer system 600 to be operable to perform the functions of the one or more software modules 609.

In one embodiment where the computer system 600 is configured as a computer that works with a backend system, the software modules 609 comprise instructions of an agent that provides the backend system with installation records of application programs that are installed on the computer system 600. In another embodiment where the computer system 600 is configured as a backend system, the software modules 609 comprise instructions of a natural language processing system for identifying software products that are installed on a computer.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying software products that are installed on a computer, the method comprising:
   receiving an application name of an application program that is installed on a computer;
   determining if the application name meets at least one of a set of initial product filtering criteria that were used to collect sample application names from which a first training dataset was selected;
   in response to the application name meeting at least one of the set of initial product filtering criteria, classifying the application name using a first encoder-only transformer model to determine if the application name is of one of a plurality of supported products that the first encoder-only transformer model has been trained, using the first training dataset, to identify;
   in response to the first encoder-only transformer model classifying the application name as that of a first supported product of the plurality of supported products, deeming the first supported product to be installed on the computer; and
   performing a cybersecurity procedure based at least on the first supported product being identified as installed on the computer.

2. The method of claim 1, wherein the first encoder-only transformer model is a token classification model that classifies each token of the application name as either a product token, a shadow token, or other token, with the product token representing a supported product, the shadow token representing a software product that is related to a supported product, and the other token not being a product token or a shadow token.

3. The method of claim 2, further comprising:
   concatenating tokens of the application name that have been classified as a product token or a shadow token into a concatenated string with a space character in between tokens,
   wherein the concatenated string maps to the first supported product.

4. The method of claim 1, further comprising:
in response to the application name meeting at least one of the set of initial product filtering criteria, classifying the application name using a second encoder-only transformer model to determine if the application name is one of the plurality of supported products that the second encoder-only transformer model has been trained, using a second training dataset, to identify; and
in response to the application name meeting at least one of the set of initial product filtering criteria, classifying the application name using a third encoder-only transformer model to determine if the application name is one of the plurality of supported products that the third encoder-only transformer model has been trained, using a third training dataset, to identify;
wherein the second training dataset and the third training dataset were selected from the sample application names.

5. The method of claim 4, wherein the first encoder-only transformer model is a token classification model, the second encoder-only transformer model is a sequence classification model, and the third encoder-only transformer model is a span classification model.

6. The method of claim 5, further comprising:
for any inference result of the token classification model, the sequence classification model, and the span classification model that indicates the application name is that of the first supported, determining if the application name meets initial product filtering criteria of the first supported product; and
deeming the application name to be that of the first supported product in response to the application name meeting the initial product filtering criteria of the first supported product and being classified by a majority of the token classification model, the sequence classification model, and the span classification model as being that of the supported product.

7. A system comprising:
a first computer comprising at least one processor and a memory, the memory of the first computer storing instructions that when executed by the at least one processor of the first computer cause the first computer to:
receive, from a second computer, a plurality of application names of application programs that are installed on the second computer;
discard from classification any of the plurality of application names that does not meet at least one of a set of initial product filtering criteria that were used to collect sample application names from which a first training dataset was selected;
classify application names that have not been discarded from classification using a first encoder-only transformer model to determine whether the application names that have not been discarded from classification are of supported products that the first encoder-only transformer model has been trained, using the first training dataset, to identify; and
declare application names that have been classified by the first encoder-only transformer model as being those of supported products that are installed on the second computer; and
the second computer comprising at least one processor and a memory, the memory of the second computer storing instructions that when executed by the at least one processor of the second computer cause the second computer to:
gather the plurality of application names of application programs that are installed on the second computer; and
transmit the plurality of application names to the first computer over a computer network.

8. The system of claim 7, wherein the first encoder-only transformer model is a token classification model that classifies each token of each of the application names that have not been discarded from classification as either a product token, a shadow token, or other token, with the product token representing a supported product, the shadow token representing a software product that is related to a supported product but is not a supported product, and the other token not being a product token or a shadow token.

9. The system of claim 8, wherein the instructions stored in the memory of the first computer, when executed by the at least one processor of the first computer, cause the first computer to:
concatenate tokens of application names that have been classified as a product token or a shadow token into concatenated strings, with a space character in between tokens; and
map the concatenated strings to supported products.

10. The system of claim 7, wherein the instructions stored in the memory of the first computer, when executed by the at least one processor of the first computer, cause the first computer to:
classify the application names that have not been discarded from classification using a second encoder-only transformer model to determine whether the application names that have not been discarded from classification are of supported products that the second encoder-only transformer model has been trained, using a second training dataset, to identify;
classify the application names that have not been discarded from classification using a third encoder-only transformer model to determine whether the application names that have not been discarded from classification are of supported products that the third encoder-only transformer model has been trained, using a third training dataset, to identify;
wherein the second training dataset and the third training dataset were selected from the sample application names.

11. The system of claim 10, wherein the first encoder-only transformer model is a token classification model, the second encoder-only transformer model is a sequence classification model, and the third encoder-only transformer model is a token classification model.

12. The system of claim 11, wherein the instructions stored in the memory of the first computer, when executed by the at least one processor of the first computer, cause the first computer to:
for any inference result of the token classification model, sequence classification model, and span classification model that indicates a particular application name as that of a particular supported product, discard the inference result if the particular application name does not meet an initial product filtering criteria of the particular supported product.

13. The system of claim 12, wherein the instructions stored in the memory of the first computer, when executed by the at least one processor of the first computer, cause the first computer to:
declare application names that have been classified by a majority of the token classification model, the sequence classification model, and the span classification model as being those of supported products to be supported products that are installed on the second computer.

14. A method of identifying software products that are installed on a computer, the method comprising:

gathering a plurality of application names of application programs that are installed on a computer;

discarding from classification any of the plurality of application names that does not meet at least one of a set of initial product filtering criteria that have been used to collect sample application names;

classifying an application name of the plurality of application names using a sequence classification encoder-only transformer model, a span classification encoder-only transformer model, and a token classification encoder-only transformer model to determine whether the application name is of one of a plurality of supported products that the sequence classification encoder-only transformer model, the span classification encoder-only transformer model, and the token classification encoder-only transformer model have been trained, using corresponding training dataset selected from the sample application names, to identify;

for any inference result of the sequence classification encoder-only transformer model, the span classification encoder-only transformer model, and the token classification encoder-only transformer model that indicates the application name is of a particular supported product, determining if the application name meets initial product filtering criteria of the particular supported product; and declaring the application name as that of the particular supported product installed on the computer in response to the application name meeting the initial product filtering criteria of the particular supported product and being classified by a majority of the sequence classification encoder-only transformer model, the span classification encoder-only transformer model, and the token classification encoder-only transformer model as that of the particular supported product; and performing a cybersecurity procedure based at least on the particular supported product being identified as being installed on the computer.

15. The method of claim 14, further comprising:

providing the gathered application names from the computer to a backend system over the Internet, wherein the application name is classified using the sequence classification encoder-only transformer, the span classification encoder-only transformer model, and the token classification encoder-only transformer model in the backend system.

* * * * *